United States Patent
Himeda et al.

(10) Patent No.: US 9,763,294 B2
(45) Date of Patent: Sep. 12, 2017

(54) LIGHTING DEVICE AND LIGHTING FIXTURE USING SAME

(71) Applicant: Panasonic Intellectual Property Management Co., Ltd., Osaka (JP)

(72) Inventors: Masato Himeda, Nara (JP); Hiroyuki Asano, Nara (JP); Masafumi Yamamoto, Kyoto (JP); Takeshi Kamoi, Kyoto (JP); Daisuke Yamahara, Osaka (JP); Keisuke Seki, Osaka (JP); Katsuyuki Doi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/944,267

(22) Filed: Nov. 18, 2015

(65) Prior Publication Data

US 2016/0150611 A1 May 26, 2016

(30) Foreign Application Priority Data

Nov. 20, 2014 (JP) .................................. 2014-235773

(51) Int. Cl.
H05B 33/08 (2006.01)
(52) U.S. Cl.
CPC ..... *H05B 33/0815* (2013.01); *H05B 33/0812* (2013.01); *Y02B 20/343* (2013.01); *Y02B 20/345* (2013.01)
(58) Field of Classification Search
CPC ......... H01L 33/00; H02M 3/155; H02M 7/12; H02M 2003/1557; H05B 33/0818; H05B 33/0851

USPC ......................... 315/276, 287, 122, 193, 257
See application file for complete search history.

(56) References Cited

U.S. PATENT DOCUMENTS

| 2004/0170037 | A1 | 9/2004 | Bucks et al. | |
|---|---|---|---|---|
| 2005/0213352 | A1* | 9/2005 | Lys | F21S 48/325 363/17 |
| 2010/0091807 | A1 | 4/2010 | Deppe et al. | |
| 2011/0062872 | A1* | 3/2011 | Jin | H05B 33/0818 315/122 |

(Continued)

FOREIGN PATENT DOCUMENTS

| JP | 2004-536434 A | 12/2004 |
|---|---|---|
| JP | 2010-521774 A | 6/2010 |

(Continued)

OTHER PUBLICATIONS

Author: Nebojsa Jelaca, Title: Powerless bleeder (WO 2014/072084 A1), Date: May 15, 2014, Pertinent pp. 1-48.*

*Primary Examiner* — Douglas W Owens
*Assistant Examiner* — Wei Chan
(74) *Attorney, Agent, or Firm* — Renner Otto Boisselle & Sklar, LLP

(57) ABSTRACT

A lighting device includes a rectifier circuit, a conversion circuit, a constant current circuit and a control circuit. The conversion circuit includes a first series circuit, a second series circuit and a third series circuit. The conversion circuit is configured to output a DC current by on/off of a switching element being controlled by the control circuit. A high potential-side terminal of the third capacitor is electrically connected to an output terminal. The low potential-side terminal of the third capacitor is electrically connected to an output terminal, via the constant current circuit.

8 Claims, 2 Drawing Sheets

(56) References Cited

U.S. PATENT DOCUMENTS

| | | | |
|---|---|---|---|
| 2011/0260617 A1* | 10/2011 | Tanaka | H05B 33/0815 315/82 |
| 2013/0099691 A1* | 4/2013 | Esaki | H05B 33/0815 315/210 |
| 2015/0180325 A1* | 6/2015 | Liang | H02M 3/33546 363/21.09 |
| 2015/0237695 A1* | 8/2015 | Jelaca | H05B 33/0815 315/291 |
| 2015/0266416 A1* | 9/2015 | Krick | B60Q 3/00 315/77 |
| 2015/0312983 A1* | 10/2015 | Hu | F21K 9/1355 315/186 |

FOREIGN PATENT DOCUMENTS

| | | |
|---|---|---|
| JP | 2010-226821 A | 10/2010 |
| JP | 2011-082204 A | 4/2011 |
| JP | 2014-103001 A | 6/2014 |
| WO | WO 03/009654 A1 | 1/2003 |
| WO | WO 2008/110990 A1 | 9/2008 |

* cited by examiner

LIGHTING DEVICE AND LIGHTING FIXTURE USING SAME

CROSS-REFERENCE TO RELATED APPLICATION

This application claims the benefit of priority of Japanese Patent Application Number 2014-235773, filed on Nov. 20, 2014, the entire contents of which are hereby incorporated by reference.

TECHNICAL FIELD

The present disclosure relates generally to lighting devices and lighting fixtures, and more particularly, to a lighting device that turns on a light source, and to a lighting fixture that uses the lighting device.

BACKGROUND ART

Switching devices have been conventionally proposed that operate light emitting diodes (LEDs) (JP 2004-536434 A, hereafter referred to as "Document 1").

The switching device disclosed in Document 1 is provided with a single-ended primary inductance converter (SEPIC).

The SEPIC is constituted by one converter method, accordingly a ripple component is superimposed on an output current. As a result, flicker radiated by the LEDs may occur when the LEDs are operated in the switching device disclosed in Document 1.

SUMMARY

It is an object of the present disclosure to provide a lighting device in which flicker radiated by a light source as an object to be lit can be suppressed, and to provide a lighting fixture in which the lighting device is used.

A lighting device according to one aspect of the present disclosure is for providing power from an AC power source to turn on a light source. The lighting device includes a pair of input terminals, a pair of output terminals, a rectifier circuit, a conversion circuit, a constant current circuit and a control circuit. The AC power source configured to output AC current may be electrically connected to the pair of input terminals. The light source may be electrically connected to the pair of output terminals. The rectifier circuit is configured to generate a pulsating current through full-wave rectification of the AC current. The conversion circuit is configured to convert the pulsating current from the rectifier circuit to a DC current, and to output the DC current to the pair of output terminals. The constant current circuit is configured to make the DC current outputted by the conversion circuit into a constant current and supply the constant current to the light source connected to between the pair of output terminals. The control circuit is configured to control the conversion circuit and the constant current circuit. The rectifier circuit includes a pair of first input ends and a pair of first output ends. The pair of first input ends is electrically connected to the pair of input terminals, respectively. The pair of first output ends is electrically connected to the conversion circuit. The conversion circuit is a single-ended primary inductance converter. The conversion circuit includes a pair of second input ends, a pair of second output ends, a first capacitor, a first series circuit, a second series circuit and a third series circuit. The pair of second input ends is electrically connected to the pair of first output ends of the rectifier circuit, respectively. The pair of second output ends is electrically connected to the pair of output terminals, respectively. The first capacitor is connected between the pair of second input ends. The first series circuit includes a first inductor and a switching element connected in series, and is connected in parallel to the first capacitor. The second series circuit includes a second capacitor and a second inductor connected in series, and is connected in parallel to the switching element. The third series circuit includes a diode and a third capacitor connected in series, and is connected in parallel to the second inductor. The third capacitor is connected between the pair of second output ends. The conversion circuit is configured to output the DC current by on/off of the switching element being controlled by the control circuit. The third capacitor comprises a high potential-side terminal and a low potential-side terminal. The high potential-side terminal is electrically connected to a first output terminal of the pair of output terminals. The low potential-side terminal is electrically connected to a second output terminal of the pair of output terminals, via the constant current circuit.

A lighting fixture according to one aspect of the present disclosure for providing power from an AC power source. The lighting fixture includes the lighting device, and the light source that can be turned on by the lighting device. The lighting device includes a pair of input terminals, a pair of output terminals, a rectifier circuit, a conversion circuit, a constant current circuit and a control circuit. The AC power source configured to output AC current may be electrically connected to the pair of input terminals. The light source may be electrically connected to the pair of output terminals. The rectifier circuit is configured to generate a pulsating current through full-wave rectification of the AC current. The conversion circuit is configured to convert the pulsating current from the rectifier circuit to a DC current, and to output the DC current to the pair of output terminals. The constant current circuit is configured to make the DC current outputted by the conversion circuit into a constant current suitable for the light source connected to between the pair of output terminals. The control circuit is configured to control the conversion circuit and the constant current circuit. The rectifier circuit includes a pair of first input ends and a pair of first output ends. The pair of first input ends is electrically connected to the pair of input terminals, respectively. The pair of first output ends is electrically connected to the conversion circuit. The conversion circuit is a single-ended primary inductance converter. The conversion circuit includes a pair of second input ends, a pair of second output ends, a first capacitor, a first series circuit, a second series circuit and a third series circuit. The pair of second input ends is electrically connected to the pair of first output ends of the rectifier circuit, respectively. The pair of second output ends is electrically connected to the pair of output terminals, respectively. The first capacitor is connected between the pair of second input ends. The first series circuit includes a first inductor and a switching element connected in series, and is connected in parallel to the first capacitor. The second series circuit includes a second capacitor and a second inductor connected in series, and is connected in parallel to the switching element. The third series circuit includes a diode and a third capacitor connected in series, and is connected in parallel to the second inductor. The third capacitor is connected between the pair of second output ends. The conversion circuit is configured to output the DC current by on/off of the switching element being controlled by the control circuit. The third capacitor comprises a high potential-side terminal and a low potential-side terminal.

The high potential-side terminal is electrically connected to a first output terminal of the pair of output terminals. The low potential-side terminal is electrically connected to a second output terminal of the pair of output terminals, via the constant current circuit.

BRIEF DESCRIPTION OF DRAWINGS

The figures depict one or more implementations in accordance with the present teaching, by way of example only, not by way of limitations. In the figures, like reference numerals refer to the same or similar elements.

DESCRIPTION OF EMBODIMENTS

Figure 1:
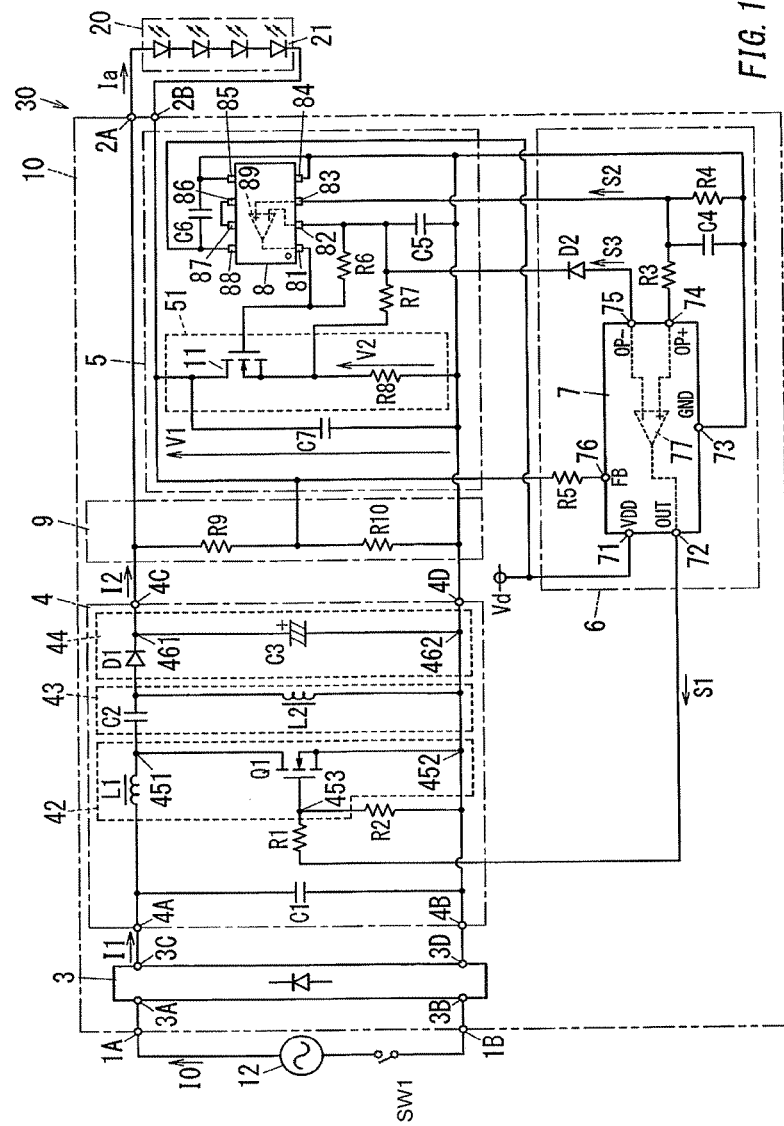
FIG. 1 is a circuit diagram of a lighting fixture provided with a lighting device of an embodiment.

A lighting device 10 of an embodiment will be explained next with reference to FIG. 1.

The lighting device 10 is configured to turn on a light source 20.

The light source 20 is provided with, for instance, a plurality (four in FIG. 1) of solid-state light-emitting elements 21. Each of the plurality of solid-state light-emitting elements 21 is, for instance, a light emitting diode (LED). The electrical connection of the plurality of solid-state light-emitting elements 21 is, for instance, a series connection. The emission color of the plurality of solid-state light-emitting elements 21 is, for instance, white.

Although the emission color of the plurality of solid-state light-emitting elements 21 of the light source 20 is set to white, the emission color is not limited thereto. In the example illustrated in FIG. 1, the electrical connection of the plurality of solid-state light-emitting elements 21 is a series connection, but is not limited thereto. The electrical connection of the plurality of solid-state light-emitting elements 21 may be, for instance, a parallel connection, or a connection scheme that combines series connection and parallel connection. The solid-state light-emitting elements 21 in the light source 20 are LEDs, but are not limited thereto. For instance, the solid-state light-emitting elements 21 may be semiconductor laser elements, organic electroluminescent elements or the like. In the example illustrated in FIG. 1, the light source 20 is provided with the plurality of solid-state light-emitting elements 21, but may be provided with just one solid-state light-emitting element 21.

The lighting device 10 is provided with a pair of input terminals 1A, 1B, a pair of output terminals 2A, 2B, a rectifier circuit 3, a conversion circuit 4, a constant current circuit 5 and a control circuit 6.

An AC power source 12 is electrically connected between the pair of input terminals 1A, 1B. The AC power source 12 is, for instance, a commercial power source. The AC power source 12 outputs an AC current (AC voltage) I0. The lighting device 10 does not include the AC power source 12 as a constituent element.

The light source 20 is electrically connected between the pair of output terminals 2A, 2B. The lighting device 10 does not include the light source 20 as a constituent element.

The rectifier circuit 3 is configured, for instance, to perform full-wave rectification of AC current I0 from the AC power source 12. The rectifier circuit 3 is, for instance, a diode bridge. In other words, the rectifier circuit 3 is configured to generate a pulsating current I1 through full-wave rectification of the AC current I0. The rectifier circuit 3 is configured to output the pulsating current I1 to the conversion circuit 4.

The rectifier circuit 3 is provided with a pair of input ends (pair of first input ends) 3A, 3B, and a pair of output ends (pair of first output ends) 3C, 3D. The pair of input ends 3A, 3B of the rectifier circuit 3 is electrically connected to the pair of input terminals 1A, 1B respectively. The pair of output ends 3C, 3D of the rectifier circuit 3 is electrically connected to the conversion circuit 4. In further detail, the pair of output ends 3C, 3D of the rectifier circuit 3 is electrically connected to a pair of input ends 4A, 4B of the conversion circuit 4, respectively. The pair of input ends 3A, 3B may be connection terminals to which there are connected conducting wires that connect to the pair of input terminals 1A, 1B, respectively, or may be part of the conducting wires that connect to the pair of input terminals 1A, 1B, respectively. The pair of output ends 3C, 3D may be connection terminals to which there are connected conducting wires that connect to the pair of input ends 4A, 4B, respectively, or may be part of the conducting wires that connect to the pair of input ends 4A, 4B, respectively.

The conversion circuit 4 is configured to convert the pulsating current I1 from the rectifier circuit 3 to DC current I2. The conversion circuit 4 is configured to output the DC current I2 to the pair of output terminals 2A, 2B. The conversion circuit 4 is a single-ended primary inductance converter (SEPIC).

The conversion circuit 4 is provided with, for instance, a capacitor (first capacitor C1) and a series circuit (first series circuit) 42 of an inductor (first inductor) L1 and a switching element Q1. The conversion circuit 4 is provided with a series circuit (second series circuit) 43 of a capacitor (second capacitor) C2 and an inductor (second inductor) L2, with a series circuit (third series circuit) 44 of a diode D1 and a capacitor (third capacitor) C3, and with two resistors R1 and R2.

The conversion circuit 4 is further provided with the pair of input ends (pair of second input ends) 4A, 4B, and the pair of output ends (pair of second output ends) 4C, 4D. The pair of input ends 4A, 4B is electrically connected to the pair of output ends 3C, 3D of the rectifier circuit 3, respectively. The pair of output ends 4C, 4D is electrically connected to the pair of output terminals 2A, 2B, respectively. The pair of input ends 4A, 4B may be connection terminals to which there are connected conducting wires, or may be part of conducting wires. The pair of output ends 4C, 4D may be connection terminals to which there are connected conducting wires, or may be part of conducting wires.

The switching element Q1 is provided with a first main terminal 451, a second main terminal 452 and a control terminal 453. The switching element Q1 is, for instance, an enhancement-type n-channel MOSFET. In the switching element Q1, the first main terminal 451 is a drain terminal, the second main terminal 452 is a source terminal, and the control terminal 453 is a gate terminal.

The first capacitor C1 is connected between the pair of input ends 4A, 4B of the conversion circuit 4.

The first series circuit 42 of the first inductor L1 and the switching element Q1 is electrically connected between both ends of the first capacitor C1. In other words, the first series circuit 42 is provided with the first inductor L1 and the switching element Q1. The first inductor L1 and the switching element Q1 are connected in series. The first series circuit 42 is connected in parallel to the first capacitor C1.

The second series circuit 43 of the second capacitor C2 and the second inductor L2 is electrically connected between the drain terminal (first main terminal 451) and the source terminal (second main terminal 452) of the switching element Q1. The gate terminal (control terminal 453) of the switching element Q1 is electrically connected to the control circuit 6, via the resistor R1. The gate terminal of the switching element Q1 is connected to the source terminal of the switching element Q1, via the resistor R2. In other words, the second series circuit 43 is provided with the second capacitor C2 and the second inductor L2. The second capacitor C2 and the second inductor L2 are connected in series. The second series circuit 43 is connected in parallel to the switching element Q1.

The third series circuit 44 of the diode D1 and the third capacitor C3 is electrically connected between both ends of the second inductor L2. The anode of the diode D1 is electrically connected to the second inductor L2. The cathode of the diode D1 is electrically connected to the third capacitor C3. In other words, the third series circuit 44 is provided with the diode D1 and the third capacitor C3. The diode D1 and the third capacitor C3 are connected in series. The third series circuit 44 is connected in parallel to the second inductor L2.

The third capacitor C3 is connected between the pair of output ends 4C, 4D of the conversion circuit 4. The third capacitor C3 is provided with a high potential-side terminal 461 and a low potential-side terminal 462.

The high potential-side terminal 461 of the third capacitor C3 is electrically connected to the output terminal (first output terminal) 2A. The low potential-side terminal 462 of the third capacitor C3 is electrically connected to the output terminal (second output terminal) 2B, via the constant current circuit 5.

The constant current circuit 5 is configured to make the DC current I2 outputted by the conversion circuit 4 into a constant current. As a result, flicker in the light can be suppressed, for instance, that an ordinary person looking at the light at the light radiated by the light source 20 does not perceive flicker in the light. Herein, the constant current of the light source 20 denotes, for instance, a current having been rendered sufficiently constant that an ordinary person looking at the light radiated by the light source 20 does not perceive flicker in the light. The constant current circuit 5 will be described in detail further on.

The control circuit 6 is configured to control the conversion circuit 4 and the constant current circuit 5. For example, the control circuit 6 is provided with an integrated circuit 7, three resistors R3 to R5, a capacitor C4 and a diode D2.

The integrated circuit 7 is provided with a first connection pin 71, a second connection pin 72, a third connection pin 73, a fourth connection pin 74, a fifth connection pin 75 and a sixth connection pin 76. The integrated circuit 19 is, for instance, a microprocessor for control (commercially available part number: R5F1076CGSP, by Renesas Electronics Co., Ltd.). In the integrated circuit 7, the first connection pin 71 is a power source terminal, the second connection pin 72 is an output terminal, and the third connection pin 73 is a ground terminal. In the integrated circuit 7, the fourth connection pin 74 is a control terminal to a non-inverting input terminal of an operational amplifier 77 included in the control circuit 6, the fifth connection pin 75 is a control terminal to an inverting input terminal of the operational amplifier 77, and the sixth connection pin 76 is a feedback terminal. VDD, OUT, GND, OP+, OP− and FB in the integrated circuit 7 shown in FIG. 1 respectively denote the first connection pin 71, the second connection pin 72, the third connection pin 73, the fourth connection pin 74, the fifth connection pin 75 and the sixth connection pin 76.

The first connection pin (VDD) 71 of the integrated circuit 7 is electrically connected to a power source circuit (not shown). The power source circuit is configured to output a DC voltage Vd. The power source circuit may be provided with a secondary winding magnetically coupled to the primary winding that is made up of the first inductor L1, and be configured to generate the DC voltage Vd with an induced voltage generated in the secondary winding.

The second connection pin (OUT) 72 of the integrated circuit 7 is electrically connected to a gate terminal of the switching element Q1, via the resistor R1.

The third connection pin (GND) 73 of the integrated circuit 7 is electrically connected to the low potential-side terminal 462 of the third capacitor C3.

The fourth connection pin (OP+) 74 of the integrated circuit 7 is electrically connected to the first end of the resistor R3. The second end of the resistor R3 is electrically connected to the third connection pin (GND) 73, via the capacitor C4. The second end of the resistor R3 is electrically connected to the first end of the resistor R4. The second end of the resistor R4 is electrically connected to the third connection pin (GND) 73. The first end of the resistor R4 is electrically connected to the constant current circuit 5. In the control circuit 6, the two resistors R3 and R4 and the capacitor C4 constitute a smoothing circuit.

The fifth connection pin (OP−) 75 is electrically connected to the constant current circuit 5, via the diode D2. An anode of the diode D2 is electrically connected to the fifth connection pin (OP−) 75 of the integrated circuit 7. A cathode of the diode D2 is electrically connected to the constant current circuit 5.

The sixth connection pin (FB) 76 of the integrated circuit 7 is electrically connected to the constant current circuit 5, via the resistor R5.

The control circuit 6 has a configuration including the integrated circuit 7, the three resistors R3 to R5, the capacitor C4 and the diode D2. However, the control circuit 6 is not limited to the above configuration.

The constant current circuit 5 is provided with a varying unit (varying circuit) 11 configured to vary the magnitude of the DC current I2 that is outputted by the conversion circuit 4, three resistors R6 to R8 and three capacitors C5 to C7, and an integrated circuit 8.

The varying unit 11 is, for instance, an enhancement-type n-channel MOSFET.

The integrated circuit 8 is provided with a first connection pin 81, a second connection pin 82, a third connection pin 83, a fourth connection pin 84, a fifth connection pin 85, a sixth connection pin 86, a seventh connection pin 87 and an eighth connection pin 88. The integrated circuit 8 is, for instance, an operational amplifier (commercially available part number: NJM2904, by New Japan Radio Co., Ltd.). The integrated circuit 8 is provided with a first operational amplifier 89 and a second operational amplifier (not shown). In the integrated circuit 8, the first connection pin 81 is an output terminal of a first operational amplifier 89. The second connection pin 82 is an inverting input terminal of the first operational amplifier 89, the third connection pin 83 is a non-inverting input terminal of the first operational amplifier 89, and the fourth connection pin 84 is a negative power source terminal. In the integrated circuit 8, the fifth connection pin 85 is a non-inverting input terminal of the second operational amplifier, the sixth connection pin 86 is an inverting input terminal of the second operational amplifier, the seventh connection pin 87 is an output terminal of the second operational amplifier and the eighth connection pin 88 is a positive power source terminal. The second operational amplifier is not used in the integrated circuit 8. Consequently, the second operational amplifier is not depicted in FIG. 1. The graphic symbols of the integrated circuit 8 in FIG. 1 denote an operational amplifier (aforementioned part number: NJM2904), by New Japan Radio Co., Ltd.

The first connection pin 81 of the integrated circuit 8 is electrically connected to a gate terminal of an n-channel MOSFET that is used as the varying unit 11. The first connection pin 81 of the integrated circuit 8 is electrically connected to the second connection pin 82 of the integrated circuit 8 via the resistor R6. The first operational amplifier 89 and the resistor R6 make up an error amplifier in the constant current circuit 5. For convenience in the explanation, the n-channel MOSFET that is used as the varying unit 11 may also be referred to as "MOSFET" for short.

The second connection pin 82 of the integrated circuit 8 is electrically connected to a source terminal of the MOSFET, via the resistor R7. The second connection pin 82 of the integrated circuit 8 is electrically connected to the low potential-side terminal 462 of the third capacitor C3 in the conversion circuit 4, via the capacitor C5. The resistor R7 and the capacitor C5 make up a filter circuit in the constant current circuit 5.

The third connection pin 83 of the integrated circuit 8 is electrically connected to a first end of the resistor R4 in the control circuit 6.

The fourth connection pin 84 and the fifth connection pin 85 of the integrated circuit 8 are electrically connected to the low potential-side terminal 462 of the third capacitor C3.

The sixth connection pin 86 of the integrated circuit 8 is electrically connected to the seventh connection pin 87 of the integrated circuit 8.

The eighth connection pin 88 of the integrated circuit 8 is electrically connected to the power source circuit. The eighth connection pin 88 of the integrated circuit 8 is electrically connected to the low potential-side terminal 462 of the third capacitor C3, via the capacitor C6.

A drain terminal of the MOSFET (varying unit 11) is electrically connected to the output terminal 2B. The drain terminal of the MOSFET is electrically connected to the low potential-side terminal 462 of the third capacitor C3, via the capacitor C7. Further, the drain terminal of the MOSFET is electrically connected to the integrated circuit 7, via the resistor R5 of the control circuit 6. The source terminal of the MOSFET is electrically connected to the low potential-side terminal 462 of the third capacitor C3 via the resistor R8.

In the example illustrated in FIG. 1, the constant current circuit 5 is configured by being provided with the varying unit 11, the three resistors R6 to R8, the three capacitors C5 to C7, and the integrated circuit 8, but the constant current circuit 5 is not limited to this configuration, and it suffices that the constant current circuit 5 be provided with a series circuit at least with the varying unit 11 and the resistor R8.

The control circuit 6 is configured to output a control signal (hereafter referred to as "first control signal") to the switching element Q1. Explained in specific terms, the integrated circuit 7 is configured to output the first control signal S1 to the switching element Q1. The first control signal S1 is a signal for controlling the switching element Q1. The first control signal S1 is a pulse width modulation (PWM) signal, for example.

The conversion circuit 4 is configured to output the DC current I2, through on-off control of the switching element Q1 by the control circuit 6 via the control signal S1.

The operation of the conversion circuit 4 will be explained next.

When in the conversion circuit 4 the switching element Q1 is brought from an off-state to an on-state, current flows in a path over the high potential-side terminal of the first capacitor C1, the first inductor L1, the switching element Q1 and the low potential-side terminal of the first capacitor C1. When in the conversion circuit 4 the switching element Q1 is brought from an off-state to an on-state, current also flows in a path over the high potential-side terminal of the second capacitor C2, the switching element Q1, the second inductor L2, and the low potential-side terminal of the second capacitor C2. When in the conversion circuit 4 the switching element Q1 is in an on-state, accordingly, magnetic energy accumulates in the first inductor L1 and the second inductor L2.

When in the conversion circuit 4 the switching element Q1 is brought from an on-state to an off-state, moreover, a back electromotive force is generated in the first inductor L1. As a result, current flows, in the conversion circuit 4, in a path over the first end of the first inductor L1, the second capacitor C2, the diode D1, the third capacitor C3, the first capacitor C1, and a second end of the first inductor L1. When in the conversion circuit 4 the switching element Q1 is brought from an on-state to an off-state, a back electromotive force is generated in the second inductor L2, and hence current flows in a path over the first end of the second inductor L2, the diode D1, the third capacitor C3, and a second end of the second inductor L2, As a result, the DC current I2 can be outputted when in the conversion circuit 4 the voltage across the third capacitor C3 is equal to or greater than a threshold voltage.

The conversion circuit 4 is an SEPIC; accordingly, for instance, a ripple component of a period twice that of the AC power source 12 is superimposed on the DC current I2. Therefore, the lighting device 10 is provided with the constant current circuit 5. The constant current circuit 5 is provided with the series circuit 51 which includes the varying unit 11 and the resistor R8. The varying unit 11 and the resistor R8 are connected in series. The series circuit 51 is electrically connected between the second output terminal 2B and the low potential-side terminal 462. The control circuit 6 is configured to control the varying unit 11 in such a manner that the magnitude of the DC current I2 is made, by the varying unit 11, into a magnitude suitable for the light source 20. That is, the control circuit 6 is configured to control the varying unit 11 in such a manner that the magnitude of the DC current I2 is set to the constant current to the light source 20. Explained in specific terms, the control circuit 6 causes the n-channel MOSFET that is used as the varying unit 11 to operate at a region (active region) where the drain current varies proportionally to the change in gate-to-source voltage. In other words, the control circuit 6 is configured to cause the n-channel MOSFET that is used as the varying unit 11 to function as a resistor component.

The control circuit 6 is configured to output a control signal (hereafter, "second control signal") S2 to the third connection pin 83 of the integrated circuit 8 in the constant current circuit 5. Explained in specific terms, the integrated circuit 7 is configured to output the second control signal S2 via the fourth connection pin (control terminal) 74 to the third connection pin 83 of the integrated circuit 8. The second control signal S2 is a signal for controlling a reference voltage applied to the non-inverting input terminal of the first operational amplifier 89 in the integrated circuit 8. The second control signal S2 is a PWM signal, for example.

The smoothing circuit of the control circuit 6 is configured to smooth the output voltage of the second control signal S2 outputted by the integrated circuit 7. The smoothing circuit is configured to output the smoothed voltage as the reference voltage to the third connection pin 83. Therefore, the control circuit 6 can modify the voltage value of the reference voltage by changing the duty ratio of the second control signal S2.

The operation of the constant current circuit 5 will be explained next.

In the constant current circuit 5, the current Ia flows in a path over the high potential-side terminal 461 of the third capacitor C3, the output terminal 2A, the light source 20, the output terminal 2B, the varying unit 11, the resistor R8, and the low potential-side terminal 462 of the third capacitor C3, when the n-channel MOSFET that is used as the varying unit 11 is in an on-state.

In the constant current circuit 5, voltage is generated across the resistor R8 when the current Ia flows in the resistor R8. In the constant current circuit 5, the voltage V2 across the resistor R8 is applied to the second connection pin 82 of the integrated circuit 8 via the filter circuit (resistor R7 and capacitor C5).

The first operational amplifier 89 in the integrated circuit 8 outputs the output voltage to the varying unit 11 in such a manner that the voltage that is applied to the inverting input terminal and the second reference voltage that is applied to the non-inverting input terminal coincide with each other.

The varying unit 11 makes variable the magnitude of the DC current I2 that is outputted by the conversion circuit 4, on the basis of the magnitude of the output voltage that is outputted by the integrated circuit 11. Explained in specific terms, the gate-to-source voltage in the varying unit 11 varies with changes in the output voltage that is outputted by the integrated circuit 8. As a result, the drain current in the varying unit 11 varies proportionally to changes in the gate-to-source voltage, and hence it becomes possible to vary the magnitude of the DC current I2 that is outputted by the conversion circuit 4. Accordingly, the magnitude of the DC current I2 that is outputted by the conversion circuit 4 in the varying unit 11 i.e. the magnitude of the current I2 that flows in the light source 20, can be brought to a magnitude that is suitable for the light source 20.

In the lighting device 10, the n-channel MOSFET that is used as the varying unit 11 is made to function as a resistor component, and hence the magnitude of the DC current I2 can be brought, by the varying unit 11, to a magnitude that is suitable for the light source 20. Accordingly, it becomes possible to reduce, in the lighting device 10, the ripple component in the DC current I2 from the conversion circuit 4. That is, the DC current I2 outputted by the conversion circuit 4 can be made into a constant current suitable for the light source 20 in the lighting device 10. As a result, for instance, flicker radiated by the light source 20 can be suppressed in the lighting device 10. It becomes also possible to prevent, in the lighting device 10, for instance, the occurrence of flicker in video images that are captured by an imaging device, such as a video camera, in an environment in which the light source 20 is turned on by the lighting device 10.

In the constant current circuit 5, the DC current I2 outputted by the conversion circuit 4 may change rapidly by the change of the AC current I0 from the AC power source 12. Accordingly, in the constant current circuit 5, the resistor R6 is preferably set to 1 MΩ, for example, such that the ripple component in the DC current I2 is decreased even if the DC current I2 outputted by the conversion circuit 4 changes rapidly. Therefore, in the lighting device 10, the ripple component in the DC current I2 can be decreased and the stability can be accordingly enhanced even if the DC current I2 outputted by the conversion circuit 4 changes rapidly.

In the lighting device 10, the voltage V1 across the series circuit 51 of the varying unit 11 and the resistor R8 is applied to the sixth connection pin (FB) 76 of the integrated circuit 7, via the resistor R5. For convenience in the explanation, the voltage V1 across the series circuit 51 of the varying unit 11 and the resistor R8 is referred to as "feedback voltage V1".

The control circuit 6 is configured to modify the duty ratio of the first control signal S1 according to the magnitude of the feedback voltage V1. Explained in specific terms, the control circuit 6 is configured to modify the duty ratio of the first control signal S1 such that the feedback voltage V1 becomes a predetermined voltage.

Figure 2:
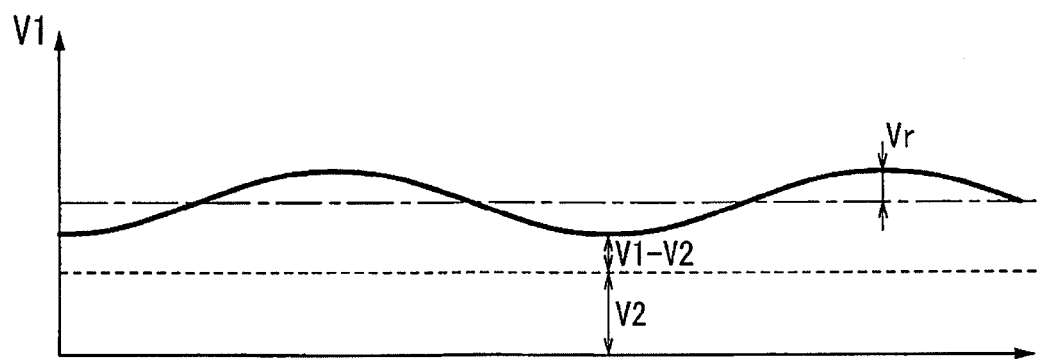
FIG. 2 is a waveform diagram illustrating a voltage waveform of a voltage across a series circuit of a varying unit and a resistor in the lighting device of the embodiment.

The inventors of the present application thought of setting the feedback voltage V1 to be a comparatively small value to decrease the power loss of the constant current circuit 5 because the power loss of the constant current circuit 5 is determined by a product of the feedback voltage V1 and the current Ia. However, the inventors of the present application found the ripple component in the DC current I2 outputted by the conversion circuit 4 cannot be decreased because the constant current circuit 5 is not operated normally when the feedback voltage V1 is set to too small a value. The inventors of the present application found that it is difficult to decrease the power loss of the constant current circuit 5 because the feedback voltage V1 is required to be set to a comparatively large value when a ripple voltage Vr (see FIG. 2) corresponding to the ripple component in the DC current I2 is large.

The inventors of the present application thought of decreasing the ripple component in the DC current I2 by setting the electrostatic capacity of the third capacitor C3 so as to set the feedback voltage V1 to the comparatively small value. For example, the electrostatic capacity of the third capacitor C3 is set to 530 µF. The inventors of the present application thought of setting the voltage V2 across the resistor R8 (see FIGS. 1 and 2) to set the feedback voltage V1 to the comparatively small value.

Explained in specific terms, the inventors of the present application thought of setting the resistance of the resistor R8 to satisfy Expression (3) below, which is obtained by combining Expression (1) with Expression (2). The reference symbol vr in Expression (1) denotes the voltage value of the ripple voltage Vr corresponding to the ripple component in the DC current I2. The reference symbol v1 in Expression (1) denotes the voltage value of the feedback voltage V1. The reference symbol v2 denotes the voltage value of the voltage V2 across the resistor R8 in Expressions (1) and (2). The reference symbol r8 in Expression (2) denotes the voltage value of the resistor R8. The reference symbol is in Expression (2) denotes the current value of the current Ia.

$$\frac{vr}{2} < v1 - v2 \qquad \text{Expression (1)}$$

-continued $$v2 = r8 \times ia \quad \text{Expression (2)}$$

$$r8 < \frac{2 \cdot v1 - vr}{2 \cdot ia} \quad \text{Expression (3)}$$

In the lighting device 10, the electrostatic capacity of the third capacitor C3 is set to a value enough to flow a current with which the light source 20 is lit for a long time when the AC current I0 does not receive from the AC power source 12, and the resistance of the resistor R8 is set to satisfy Expression (3). Therefore, in the lighting device 10, it is possible to set the feedback voltage V1 to the comparatively small value, and the power loss of the constant current circuit 5 can be accordingly decreased. As a result, in the lighting device 10, the consumption power can be decreased, and the energy-saving can be performed.

The capacitance of the third capacitor C3 in the lighting device 10 is set to be comparatively large. In this case, there is a possibility that it takes a comparatively long time for the charge accumulated in the third capacitor C3 to be discharged, when the AC current I0 from the AC power source 12 is no longer being inputted. As a result, there is a possibility that light from the light source 20 may go on being emitted even when, for instance, the AC current I0 is no longer being inputted from the AC power source 50, in the lighting device 10. Preferably, therefore, the lighting device 10 is provided with a limiting circuit 9 that is capable of limiting the voltage that is applied to the light source 20. For convenience in the explanation, the time at which the AC current I0 is no longer being inputted from the AC power source 12 will be referred to as "when the AC power source 12 is turned off". The time at which the AC power source 12 is turned off denotes a point in time in which, for instance, the power source switch SW1 that is connected between the AC power source 12 and the input terminal 1A, or between the AC power source 12 and the input terminal 1 B, is switched off.

The limiting circuit 9 is provided with a series circuit of a resistor R9 and a resistor R10. The series circuit of the resistor R9 and the resistor R10 is electrically connected between both ends of the third capacitor C3. In other words, the limiting circuit 9 is connected in parallel to the third capacitor C3.

Preferably, the resistance value of the resistor R9 and the resistance value of the resistor R10 are set in such a manner that the voltage that is applied to the light source 20 is lower than the lighting voltage of the light source 20 when the AC power source 12 is turned off. Preferably, the control circuit 6 controls the constant current circuit 5 in such a way so as to stop outputting of the output voltage from the integrated circuit 8 to the varying unit 11 when the AC power source 12 is turned off. The lighting voltage of the light source 20 denotes herein the minimum voltage that enables lighting of the light source 20. When each of the plurality of solid-state light-emitting elements 21 is an LED, for instance, the lighting voltage of the light source 20 is the total forward voltage (forward direction voltage) in the plurality of solid-state light-emitting elements 21.

Explained in specific terms, the control circuit 6 is configured to output a control signal (hereafter "third control signal") S3 to the second connection pin 82 of the integrated circuit 8 in the constant current circuit 5 when the AC power source 12 is turned off. More specifically, the integrated circuit 7 is configured to output the third control signal S3 to the second connection pin 82 of the integrated circuit 8 when the AC power source 12 is turned off. The third control signal S3 is a signal for controlling a voltage applied to the inverting input terminal of the first operational amplifier 89 in the integrated circuit 8. The third control signal S3 is a pulse signal, for example. The integrated circuit 7 is configured to modify the signal level of the third control signal S3 from a low level to a high level when the AC power source 12 is turned off. As a result, in the lighting device 10, it becomes possible to stop the outputting of the output voltage from the integrated circuit 8 to the varying unit 11 when the AC power source 12 is turned off. In the lighting device 10, the voltage that is applied to the light source 20 can be made lower, by the limiting circuit 9, than the lighting voltage of the light source 20 when the AC power source 12 is turned off. Therefore, it becomes possible to prevent continued emission of light by the light source 20 when the AC power source 12 in the lighting device 10 is turned off. The method for detecting when the AC power source 12 has been turned off by the control circuit 6 may involve, for instance, detecting the time at which the DC voltage Vd that is supplied to the first connection pin (VDD) 71 of the integrated circuit 7 becomes lower than a specified voltage. The lighting device 10 described above includes the pair of input terminals 1A, 1B, the pair of output terminals 2A, 2B, and the rectifier circuit 3 configured to perform full-wave rectification of the AC current JO. The lighting device 10 further includes the conversion circuit 4 configured to convert the pulsating current I1 from the rectifier circuit 3 into the DC current I2, and to output the DC current I2 to the pair of output terminals 2A, 2B. The lighting device 10 further includes: the constant current circuit 5 configured to make the DC current I2 outputted by the conversion circuit 4 into a constant current suitable for the light source 20 connected to between the pair of output terminals 2A, 2B; and the control circuit 6 configured to control the conversion circuit 4 and the constant current circuit 5. The pair of input ends 1A, 1B is electrically connected to the pair of input ends 3A, 3B of the rectifier circuit 3, respectively. The pair of output ends 3C, 3D is electrically connected to the pair of input ends 4A, 4B of the conversion circuit 4. The conversion circuit 4 is the SEPIC. The conversion circuit 4 includes: the first capacitor C1 connected between the pair of input ends 4A, 4B of the conversion circuit 4; and the first series circuit 42 of the first inductor L1 and the switching element Q1, which is connected between both ends of the first capacitor C1. The conversion circuit 4 further includes the second series circuit 43 of the second capacitor C2 and the second inductor L2, which is connected between the first main terminal 451 and the second main terminal 452 of the switching element Q1. The conversion circuit 4 further includes the third series circuit 44 of the diode D1 and the third capacitor C3, which is connected between both ends of the second inductor L2. The third capacitor C3 is connected to the pair of output ends 4C, 4D of the conversion circuit 4. The conversion circuit 4 is configured to output the DC current I2 by on/off of the switching element Q1 being controlled by the control circuit 6. The high potential-side terminal 461 of the third capacitor C3 is electrically connected to the first output terminal 2A of the pair of output terminals 2A, 2B. The low potential-side terminal 462 of the third capacitor C3 is electrically connected to the second output terminal 2B of the pair of output terminals 2A, 2B, via the constant current circuit 5.

In other words, the lighting device 10 described above includes the pair of input terminals 1A, 1B, the pair of output terminals 2A, 2B, the rectifier circuit 3, the conversion circuit 4, the constant current circuit 5 and the control circuit 6. The AC power source 12 is configured to output the AC current I0 is electrically connected to the pair of input terminals 1A, 1B. The light source 20 is electrically connected to the pair of output terminals 2A, 2B. The rectifier circuit 3 is configured to generate the pulsating current I1 by full-wave rectification of the AC current I0. The conversion circuit 4 is configured to convert the pulsating current I1 from the rectifier circuit 3 into the DC current I2, and to output the DC current I2 to the pair of output terminals 2A, 2B. The constant current circuit 5 is configured to make the DC current I2 outputted by the conversion circuit 4 into a constant current and supply the constant current to the light source 20 connected to between the pair of output terminals 2A, 2B. The control circuit 6 is configured to control the conversion circuit 4 and the constant current circuit 5. The rectifier circuit 3 includes the pair of first input ends (the pair of input ends 3A, 3B) and the pair of first output ends (the pair of output ends 3C, 3D). The pair of first input ends is electrically connected to the pair of input terminals 1A, 1B, respectively. The pair of first output ends is electrically connected to the conversion circuit 4. The conversion circuit 4 is the SEPIC. The conversion circuit 4 includes the pair of second input ends (the pair of input ends 4A, 4B), the pair of second output ends (the pair of output ends 4C, 4D), the first capacitor C1, the first series circuit 42, the second series circuit 43 and the third series circuit 44. The pair of second input ends is electrically connected to the pair of first output ends of the rectifier circuit 3, respectively. The pair of second output ends is electrically connected to the pair of output terminals 2A, 2B, respectively. The first capacitor C1 is connected between the pair of second input ends. The first series circuit 42 includes the first inductor L1 and the switching element Q1, which are connected in series, and being connected in parallel to the first capacitor C1. The second series circuit 43 includes the second capacitor C2 and the second inductor L2, which are connected in series, and is connected in parallel to the switching element Q1. The third series circuit 44 includes the diode D1 and the third capacitor C3, which are connected in series, and is connected in parallel to the second inductor L2. The third capacitor C3 is connected between the pair of second output ends. The conversion circuit 4 is configured to output the DC current I2 by on/off of the switching element Q1 being controlled by the control circuit 6. The third capacitor C3 includes the high potential-side terminal 461 and the low potential-side terminal 462. The high potential-side terminal 461 is electrically connected to the first output terminal 2A of the pair of output terminals 2A, 2B. The low potential-side terminal 462 is electrically connected to the second output terminal 2B of the pair of output terminals 2A, 2B, via the constant current circuit 5.

Therefore, the DC current I2 outputted by the conversion circuit 4 can be made into a constant current suitable for the light source 20 in the lighting device 10. That is, it becomes possible to reduce, in the lighting device 10, the ripple component in the DC current I2 from the conversion circuit 4. As a result, flicker radiated by the light source 20 can be suppressed in the lighting device 10.

The constant current circuit 5 preferably includes the series circuit 51 of the resistor R8 and the varying unit 11. The varying unit 11 is preferably configured to vary the magnitude of the DC current I2 that is outputted by the conversion circuit 4. The control circuit 6 is preferably configured to control the varying unit 11 in such a manner that the magnitude of the DC current I2 is set to the constant current to the light source 20. Therefore, in the lighting device 10, the DC current I2 outputted by the conversion circuit 4 can be made into a constant current suitable for the light source 20 by the varying unit 11, and it becomes possible to reduce the ripple component in the DC current I2 from the conversion circuit 4. As a result, flicker radiated by the light source 20 can be suppressed in the lighting device 10.

More preferably, the series circuit 51 is electrically connected between the second output terminal 2B and the low potential-side terminal 462 of the third capacitor C3.

Figure 3:
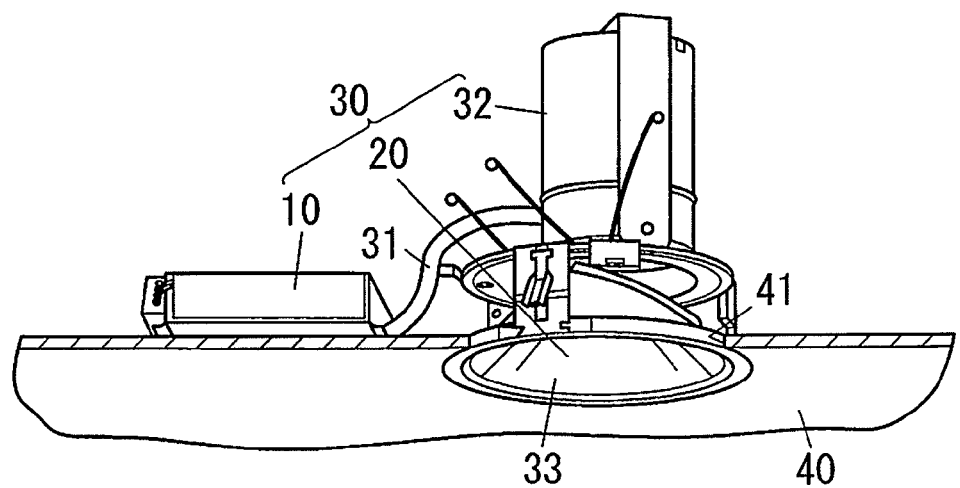
FIG. 3 is a partial cutaway schematic perspective-view diagram of the lighting fixture provided with the lighting device of the embodiment in a construction state.

A lighting fixture 30 provided with the lighting device 10 will be explained next with reference to FIG. 3.

The lighting fixture 30 is, for instance, a downlight. The lighting fixture 30 is configured, for instance, to be disposed in a ceiling material 40. Explained in specific terms, the lighting fixture 30 is configured, for instance, to be disposed embedded in a hole 41 that is formed in the ceiling material 40.

The lighting fixture 30 is provided with, for instance, the lighting device 10, the light source 20, a connecting line 31 and a fixture body 32.

The light source 20 is provided with a reflective plate 33 that reflects light emitted by the plurality of solid-state light-emitting elements 21.

The lighting device 10 is electrically connected to the light source 20 (plurality of solid-state light-emitting elements 21) via the connecting line 31.

The light source 20 is mounted on the fixture body 32. Explained in specific terms, the fixture body 32 is configured so that the light source 20 is mounted thereon.

In the example illustrated in the figure, the fixture body 32 is configured so that the light source 20 is mounted on the fixture body 32, but the latter is not limited to this configuration. The fixture body 32 may be configured so that the lighting device 10 and the light source 20 are mounted on the fixture body 32. In the example illustrated in the figure, specifically, the lighting fixture 30 is a lighting fixture of separate power supply type in which the lighting device 10 and the light source 20 are disposed separately, but the lighting fixture 30 is not limited thereto. The lighting fixture 30 may be a lighting fixture of integrated power supply type in which the lighting device 10 and the light source 20 are mounted on the fixture body 32.

The lighting fixture 30 is not limited to a downlight, and may be, for instance, a ceiling light, a spotlight or the like.

The lighting fixture 30 explained above is provided with the lighting device 10 and the light source 20 that can be turned on by the lighting device 10. As a result, flicker radiated by the light source 20 can be suppressed in the lighting fixture 30. It becomes also possible to prevent, in the lighting fixture 30, for instance, the occurrence of flicker in video images that are captured by an imaging device, such as a video camera, in an environment in which the light source 20 is turned on by the lighting fixture 30.

As shown in the embodiment described above, a lighting device (10) according to the first aspect of the present disclosure is for providing power from an AC power source to turn on a light source. The lighting device (10) includes a pair of input terminals (1A, 1B), a pair of output terminals (2A, 2B), a rectifier circuit (3), a conversion circuit (4), a constant current circuit (5) and a control circuit (6). The AC power source (12) is configured to output an AC current (I0) and may be electrically connected to the pair of input terminals (1A, 1B). The light source (20) may be electrically connected to the pair of output terminals (2A, 2B). The rectifier circuit (3) is configured to generate a pulsating current (I1) by full-wave rectification of the AC current (I0). The conversion circuit (4) is configured to convert the pulsating current (I1) from the rectifier circuit (3) into a DC current (I2), and to output the DC current (I2) to the pair of output terminals (2A, 2B). The constant current circuit (5) is configured to make the DC current (I2) outputted by the conversion circuit (4) into a constant current and supply the constant current to the light source (20) connected to between the pair of output terminals (2A, 2B). The control circuit (6) is configured to control the conversion circuit (4) and the constant current circuit (5). The rectifier circuit (3) includes a pair of first input ends and a pair of first output ends. The pair of first input ends is electrically connected to the pair of input terminals (1A, 1B), respectively. The pair of first output ends is electrically connected to the conversion circuit (4). The conversion circuit (4) is an SEPIC. The conversion circuit (4) includes a pair of second input ends, a pair of second output ends, a first capacitor (C1), a first series circuit (42), a second series circuit (43) and a third series circuit (44). The pair of second input ends is electrically connected to the pair of first output ends of the rectifier circuit (3), respectively. The pair of second output ends is electrically connected to the pair of output terminals (2A, 2B), respectively. The first capacitor (C1) is connected between the pair of second input ends. The first series circuit (42) includes a first inductor (L1) and a switching element (Q1), which are connected in series, and being connected in parallel to the first capacitor (C1). The second series circuit (43) includes a second capacitor (C2) and a second inductor (L2), which are connected in series, and being connected in parallel to the switching element (Q1). The third series circuit (44) includes a diode (D1) and a third capacitor (C3), which are connected in series, and being connected in parallel to the second inductor (L2). The third capacitor (C3) is connected between the pair of second output ends. The conversion circuit (4) is configured to output the DC current (I2) by on/off of the switching element (Q1) being controlled by the control circuit (6). The third capacitor (C3) includes a high potential-side terminal (461) and a low potential-side terminal (462). The high potential-side terminal (461) is electrically connected to a first output terminal (2A) of the pair of output terminals (2A, 2B). The low potential-side terminal (462) is electrically connected to a second output terminal (2B) of the pair of output terminals (2A, 2B), via the constant current circuit (5).

In the lighting device (10) according to the first aspect, the DC current (I2) outputted by the conversion circuit (4) can be made into a constant current suitable for the light source (20). That is, it becomes possible to reduce, in the lighting device (10), the ripple component in the DC current (I2) from the conversion circuit (4). As a result, flicker radiated by the light source (20) can be suppressed in the lighting device (10).

In the lighting device (10) according to the second aspect of the present disclosure realized in combination with the first aspect, the constant current circuit (5) includes a series circuit (51) of a resistor (R8) and a varying unit (11) (varying circuit). The varying unit (11) is configured to vary the magnitude of the DC current (I2) that is outputted by the conversion circuit (4). The control circuit (6) is configured to control the varying unit (11) in such a manner that the magnitude of the DC current (I2) is made, by the varying unit (11), into a magnitude set to the constant current to the light source (20).

In the lighting device (10) according to the second aspect, the DC current (I2) outputted by the conversion circuit (4) can be made into a constant current suitable for the light source (20) by the varying unit (11), and it becomes possible to reduce the ripple component in the DC current (I2) from the conversion circuit (4). As a result, flicker radiated by the light source (20) can be suppressed in the lighting device (10).

In the lighting device (10) according to the third aspect of the present disclosure realized in combination with the second aspect, the series circuit (51) is electrically connected between the second output terminal (2B) and the low potential-side terminal (462) of the third capacitor (C3).

A lighting fixture (30) according to the fourth aspect of the present disclosure, includes: the lighting device (10) according to any one of the first to third aspects; and the light source (20) that can be turned on by the lighting device (10).

In the lighting fixture (30) according to the fourth aspect, flicker radiated by the light source (20) can be suppressed. It becomes also possible to prevent, in the lighting fixture (30), for instance, the occurrence of flicker in video images that are captured by an imaging device, such as a video camera, in an environment in which the light source (20) is turned on by the lighting fixture (30).

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A lighting device for providing power from an AC power source to turn on a light source, comprising:
   a pair of input terminals to which the AC power source configured to output an AC current may be electrically connected;
   a pair of output terminals to which the light source may be electrically connected;
   a rectifier circuit configured to generate a pulsating current by full-wave rectification of the AC current;
   a conversion circuit configured to convert the pulsating current from the rectifier circuit into a DC current, and to output the DC current to the pair of output terminals;
   a constant current circuit configured to make the DC current outputted by the conversion circuit into a constant current and supply the constant current to the light source connected to between the pair of output terminals; and
   a control circuit configured to control the conversion circuit and the constant current circuit,
   wherein the rectifier circuit comprises:
   a pair of first input ends electrically connected to the pair of input terminals, respectively; and
   a pair of first output ends electrically connected to the conversion circuit,
   wherein the conversion circuit is a single-ended primary inductance converter,
   wherein the conversion circuit comprises:
   a pair of second input ends electrically connected to the pair of first output ends of the rectifier circuit, respectively;
   a pair of second output ends electrically connected to the pair of output terminals, respectively;
   a first capacitor connected between the pair of second input ends;
   a first series circuit comprising a first inductor and a switching element, which are connected in series, and being connected in parallel to the first capacitor;

a second series circuit comprising a second capacitor and a second inductor, which are connected in series, and being connected in parallel to the switching element; and a third series circuit comprising a diode and a third capacitor, which are connected in series, and being connected in parallel to the second inductor, wherein the third capacitor is connected between the pair of second output ends, wherein the conversion circuit is configured to output the DC current by on/off of the switching element being controlled by the control circuit, wherein the third capacitor comprises a high potential-side terminal and a low potential-side terminal, the high potential-side terminal being electrically connected to a first output terminal of the pair of output terminals, the low potential-side terminal being electrically connected to a second output terminal of the pair of output terminals, via the constant current circuit, wherein the lighting device further comprises a limiting circuit that is capable of limiting a voltage that is applied to the light source, wherein the limiting circuit includes a series circuit of a plurality of resistors connected in parallel to the third capacitor, and wherein a connection point between any two resistors of the plurality of resistors is connected to a connection point between the light source and the constant current circuit.

2. The lighting device according to claim 1, wherein the constant current circuit comprises a series circuit of a resistor and a varying circuit configured to vary a magnitude of the DC current that is outputted by the conversion circuit, and wherein the control circuit is configured to control the varying circuit in such a manner that the magnitude of the DC current is set to supply the constant current to the light source.

3. The lighting device according to claim 2, wherein the series circuit of the resistor and the varying circuit is electrically connected between the second output terminal and the low potential-side terminal of the third capacitor.

4. The lighting device according to claim 1, wherein a resistance value of each of the plurality of resistors is set in such a manner that when the AC power source is turned off, the voltage that is applied to the light source is less than a lighting voltage of the light source.

5. A lighting fixture for providing power from an AC power source, comprising:
a lighting device; and
a light source that can be turned on by the lighting device, wherein the lighting device, comprising:
a pair of input terminals to which the AC power source configured to output an AC current may be electrically connected;
a pair of output terminals to which the light source may be electrically connected;
a rectifier circuit configured to generate a pulsating current by full-wave rectification of the AC current;
a conversion circuit configured to convert the pulsating current from the rectifier circuit into a DC current, and to output the DC current to the pair of output terminals;
a constant current circuit configured to make the DC current outputted by the conversion circuit into a constant current suitable for the light source connected to between the pair of output terminals; and a control circuit configured to control the conversion circuit and the constant current circuit, wherein the rectifier circuit comprises:
a pair of first input ends electrically connected to the pair of input terminals, respectively; and
a pair of first output ends electrically connected to the conversion circuit, wherein the conversion circuit is a single-ended primary inductance converter, wherein the conversion circuit comprises:
a pair of second input ends electrically connected to the pair of first output ends of the rectifier circuit, respectively;
a pair of second output ends electrically connected to the pair of output terminals, respectively;
a first capacitor connected between the pair of second input ends;
a first series circuit comprising a first inductor and a switching element, which are connected in series, and being connected in parallel to the first capacitor;
a second series circuit comprising a second capacitor and a second inductor, which are connected in series, and being connected in parallel to the switching element; and
a third series circuit comprising a diode and a third capacitor, which are connected in series, and being connected in parallel to the second inductor, wherein the third capacitor is connected between the pair of second output ends, wherein the conversion circuit is configured to output the DC current by on/off of the switching element being controlled by the control circuit, wherein the third capacitor comprises a high potential-side terminal and a low potential-side terminal, the high potential-side terminal being electrically connected to a first output terminal of the pair of output terminals, the low potential-side terminal being electrically connected to a second output terminal of the pair of output terminals, via the constant current circuit, wherein the lighting device further comprises a limiting circuit that is capable of limiting a voltage that is applied to the light source, wherein the limiting circuit includes a series circuit of a plurality of resistors connected in parallel to the third capacitor, and wherein a connection point between any two resistors of the plurality of resistors is connected to a connection point between the light source and the constant current circuit.

6. The lighting fixture according to claim 5, wherein the constant current circuit comprises a series circuit of a resistor and a varying circuit configured to vary a magnitude of the DC current that is outputted by the conversion circuit, and wherein the control circuit is configured to control the varying circuit in such a manner that the magnitude of the DC current is made, by the varying circuit, into a magnitude suitable for the light source.

7. The lighting fixture according to claim 6, wherein the series circuit of the resistor and the varying circuit is electrically connected between the second output terminal and the low potential-side terminal of the third capacitor.

8. The lighting fixture according to claim 5, wherein a resistance value of each of the plurality of resistors is set in such a manner that when the AC power source is turned off, the voltage that is applied to the light source is less than a lighting voltage of the light source.

* * * * *